United States Patent [19]

Bhattacharyya et al.

[11] Patent Number: 4,715,962
[45] Date of Patent: Dec. 29, 1987

[54] AMPHOLYTIC DIALLYLDIMETHYL AMMONIUM CHLORIDE (DADMAC) COPOLYMERS AND TERPOLYMERS FOR WATER CLARIFICATION

[75] Inventors: Bhupati R. Bhattacharyya, Downers Grove; Sanjay R. Srivatsa, Naperville; Michael L. Dwyer, Crest Hill, all of Ill.

[73] Assignee: Nalco Chemical Company, Naperville, Ill.

[21] Appl. No.: 896,791

[22] Filed: Aug. 15, 1986

[51] Int. Cl.$^4$ ................................................ C02F 1/56
[52] U.S. Cl. .................................... 210/708; 210/734; 210/735; 210/928; 252/341; 252/344; 252/358
[58] Field of Search ............... 210/708, 725, 727, 728, 210/733-735, 928; 252/340, 341, 344, 358; 524/922

[56] References Cited

U.S. PATENT DOCUMENTS

| | | | |
|---|---|---|---|
| 3,288,770 | 11/1966 | Butler | 526/204 |
| 3,461,163 | 8/1969 | Boothe | 210/735 |
| 3,585,148 | 6/1971 | Sackis | 210/708 |
| 3,899,471 | 8/1975 | Lorenz et al. | 210/734 |
| 3,920,599 | 11/1975 | Hurlock et al. | 524/801 |
| 4,077,930 | 3/1978 | Lim et al. | 210/734 |
| 4,120,815 | 10/1978 | Raman | 252/344 |

*Primary Examiner*—Peter Hruskoci
*Attorney, Agent, or Firm*—John G. Premo; Anthony L. Cupoli; Donald G. Epple

[57] ABSTRACT

A method of removing impurities from water which comprises treating these impurity-containing waters with a few parts per million of a water-soluble polymer containing a major portion of Diallyldimethyl Ammonium Chloride and ether.

A. from 5 to 25 mole percent of either acrylic acid or methacrylic acid, or,

B. from 5 to 25 mole percent of either acrylic acid or methacrylic acid and from 1-10 percent of a hydroxy $C_2$-$C_6$ alkyl acrylate or methacrylate:

which polymer is characterized as having an intrinsic viscosity of at least 0.5.

6 Claims, No Drawings

AMPHOLYTIC DIALLYLDIMETHYL AMMONIUM CHLORIDE (DADMAC) COPOLYMERS AND TERPOLYMERS FOR WATER CLARIFICATION

BACKGROUND OF THE INVENTION

A variety of industries utilize raw water for steam generation, cooling and process water which has to be purified of colloidal matter such as clays, organics, etc. In turn, these industries generate vast quantities wastewater containing high concentrations of organics, oil emulsions, clay particulates, BOD and COD which has to be purified before it is returned to nature. Both the raw water and wastewater particulates are stabilized by a number of factors ranging from natural electrokinetic forces, solubilization, to high concentration of chemicals such as surfactants.

In recent years, the use of low molecular weight water-soluble polyelectrolytes has become quite popular in treating these waters. Conventional practices include chemistries such as polyethyleneamine, epichlorohydrin/dimethylamine and diallyldimethylammonium chloride. While diallyldimethylammonium chloride (DADMAC) polymers have proven effective and are claimed to be an industry standard, they are costly and must be used at high dosages. Furthermore owing to their high frequency of cationic charge distribution, their dosage window is rather narrow, resulting in poor runnability.

The idea for the synthesis of low molecular weight copolymers of DADMAC was generated due to the unique structural feature of polyDADMAC. It is known that the DADMAC monomer can be polymerized with the five-membered ring structure in the backbone with cationic pendant groups. These rings on the polymeric backbone impart ridity on the macromolecule, and the cationic pendant groups impart water solubility.

According to the application needs, if the rigid structure of polyDADMAC could be further modified to incorporate degrees of flexibility by copolymerization with suitable comonomers, an advance in the art would be offered.

SUMMARY OF THE INVENTION

A method of removing impurities from water which comprises treating these impurity-containing waters with a few parts per million of a water-soluble polymer containing a major portion of Diallyldimethyl Ammonium Chloride and either, A. from 5 to 25 mole percent of either acrylic acid or methacrylic acid, or, B. from 5 to 25 mole percent of either acrylic acid or methacrylic acid and from 1-10 percent of a hydroxy $C_2$-$C_6$ alkyl acrylate or a lower hydroxy alkyl methacrylate:

which polymer is characterized as having an intrinsic viscosity of at least 0.5.

In a preferred embodiment of the invention, the hydroxy propyl acrylates or methacrylates when incorporated into the terpolymers, give the best results when these polymers are used to clarify waste waters.

Copolymerization of DADMAC with acrylic acid or methacrylic acid imparts unique structural features to the polyDADMAC macromolecule resulting in improved activity. Acrylic acid and methacrylic acid at low pH (2.5) behave as a non-ionic moiety in the copolymer. According to the pH of the substrate (generally 5 and above), the acid residues become deprotonated and the DADMAC/acrylic acid may undergo intramolecular and intermolecular coacervation resulting in a more rigid structure.

PREPARATION OF THE DADMAC POLYMERS OF THE INVENTION

The DADMAC polymers are prepared using either conventional solution polymerization techniques or they may be prepared using the so-called reverse or water-in-oil emulsion technique which will be discussed more fully hereafter.

As indicated above, whether the solution or inverse emulsion technique is used, it is important that the polymerization be conducted at a pH below 5 and preferably at a pH less than 2.5. The polymerization uses a preferred embodiment free radical catalysts.

In either polymerization system, it is important that it be conducted under conditions designed to produce finished polymers having intrinsic viscosities of greater than 0.5. Polymers having this minimum intrinsic viscosity are superior when these polymers are used to treat a variety of waters which are contaminated with impurities.

SOLUTION POLYMERIZATIONS

To illustrate the conditions under which solution polymerization would be conducted in preparing DADMAC polymers of the invention, the following is presented:

| Typical Solution Polymerization Conditions DADMAC/Acrylic Acid Copolymer | |
|---|---|
| 1. 67% DADMAC monomer solution | 426.9 gm |
| 2. DI water | 78.9 gm |
| 3. Acrylic acid | 14.0 gm |
| 4. Versene | 0.2 gm |
| 5. 25% Ammonium persulfate solution | 17.1 ml. |
| DI $H_2O$ | 456.9 gm |

Procedure

A. Items 1, 2, 3 and 4 were mixed together (pH 4.4±0.4) and were added into the reaction vessel equipped with stirrer, $N_2$-inlet, condenser, heater and thermometer.

B. Heat reaction mixture to 65° C. and purge nitrogen.

C. Start addition of item 5. Addition time for initiator solution is three hours.

D. Maintain reaction temperature at 65° C. during the initiator addition.

E. Hold the reaction temperature at 65° for 30 minutes after complete addition of initiator.

F. Then raise the temperature to 80° C. and hold that temperature for one hour.

G. Cool the reaction mixture to room temperature.

| Typical Formulation of Terpolymers of DADMAC/Acrylic Acid/Hydroxy Propyl Acrylate | |
|---|---|
| 1. 67% DADMAC Solution | 415.0 gm |
| 2. DI water | 68.2 gm |
| 3. Acrylic Acid | 14.0 gm |
| 4. Hydroxy propyl acrylate | 8.0 gm |
| 5. Versene | 0.2 gm |
| 6. 12.5% Ammonium persulfate solution (5.79 ml/hr for 3 hours) | 17.4 ml |

-continued

| Typical Formulation of Terpolymers of DADMAC/Acrylic Acid/Hydroxy Propyl Acrylate | |
|---|---|
| DI H$_2$O | 477.2 gm |

Using the above general procedure, a large number of polymerizations are conducted. The results of these polymerizations are set forth below in Table I:

2. Preferably from 1–15%;
3. Most preferably from 1.2–10%.

It is also possible to further characterize the water-in-oil emulsions of the DADMAC polymers with respect to the aqueous phase of the emulsions. The aqueous phase is generally defined as the sum of the polymer present in the emulsion plus the amount of water present in the emulsion. This terminology may also be utilized in describing the water-in-oil emulsions which are

TABLE I

Solution Polymerization
10 Mole % Acrylic Acid/DADMAC Solution Polymer

| Polymer No. | Solid | APS[1] % (BOM) | MOLE % DADMAC[2] | MOLE % AA[3] | MOLE % HPA[4] | NaCL (sas) | DADMAC pH | ACETIC Acid(sa) | FINAL pH | BFV[5] 30 RPM | BFV 12 RPM | IV[6] |
|---|---|---|---|---|---|---|---|---|---|---|---|---|
| 1 | 30 | 1.45 | 90.0 | 10.0 | | | 7.47 | | 4.03 | 4600 | 5000 | 0.69 |
| 2 | 30 | 1.45 | 90.0 | 10.0 | | | 7.47 | | 4.78 | 8000 | 8500 | 0.90 |
| 3 | 30 | 1.45 | 90.0 | 10.0 | | | 7.49 | 19.6 | 4.19 | 2400 | 2500 | 0.61 |
| 4 | 30 | 1.45 | 90.0 | 10.0 | | | 7.54 | | 4.73 | 6000 | 6250 | 0.82 |
| 5 | 30 | 1.45 | 90.0 | 10.0 | | 104 | 7.54 | | 4.73 | 8800 | 9000 | 0.83 |
| 6 | 30 | 1.45 | 90.0 | 10.0 | | | 7.40 | | 4.64 | 7900 | 8200 | 0.89 |
| 7 | 30 | 1.45 | 90.0 | 10.0 | | | 7.38 | 17.6 | 4.38 | 4700 | 4800 | 0.72 |
| 8 | 30 | 1.45 | 90.0 | 10.0 | | | 7.42 | | | 4700 | 4800 | 0.78 |
| 9 | 30 | 1.45 | 90.0 | 10.0 | | | 7.42 | 17.4 | | 8600 | 8800 | 0.67 |
| 10 | 30 | 1.45 | 90.0 | 10.0 | | | 7.00 | | | 8900 | 9000 | 0.91 |
| 11 | 30 | 1.45 | 90.0 | 10.0 | | | 7.42 | 17.4 | | 6300 | 6500 | 0.74 |
| 12 | | | | | | | | | | | | |
| 13 | 30 | 1.45 | 90.0 | 10.0 | | | 7.01 | | 4.25 | 5800 | 5750 | 0.83 |
| 14 | 30 | 1.45 | 90.0 | 10.0 | | | 7.01 | 10.0 | 4.10 | 7900 | 8000 | 0.92 |
| 15 | | | | | | | | | | | | |
| 16 | 30 | 1.45 | 90.0 | 10.0 | | 104 | 7.07 | | 4.52 | 2800 | 3000 | 0.67 |
| 17 | 30 | 1.45 | 90.0 | 10.0 | | 104 | 7.09 | | 4.50 | 17000 | 18000 | 0.90 |
| 18 | 30 | 1.45 | 85.4 | 9.4 | 5.2 | | 7.28 | | 4.82 | 5000 | 5000 | 0.92 |
| 19 | 30 | 1.45 | 90.0 | 9.0 | 1.0 | | 6.88 | | | 4000 | 4000 | 0.81 |
| 20 | 30 | 1.45 | 90.0 | 10.0 | | 104 | 6.73 | | 4.39 | 13000 | 13500 | 0.87 |
| 21 | 30 | 1.45 | 90.0 | 10.0 | | 104 | 6.73 | | 4.40 | 11500 | 11700 | 0.85 |
| 22 | 30 | 1.45 | 80.0 | 15.0 | 5.0 | | 6.89 | | 3.37 | 800 | 900 | 0.54 |
| 23 | 30 | 1.45 | 86.7 | 9.5 | 3.8 | | 6.88 | | 3.71 | 4000 | 4000 | 0.71 |
| 24 | 30 | 1.45 | 84.0 | 14.0 | 2.0 | | | | | 2000 | 2000 | 0.64 |
| 25 | 30 | 1.45 | 85.0 | 12.0 | 3.0 | | | | | 1700 | 1800 | 0.61 |
| 26 | 30 | 1.45 | 90.0 | 10.0 | | | | | | 4900 | 5000 | 0.85 |
| 27 | 30 | 1.45 | 90.0 | 10.0 | | 104 | | | | 12000 | 13000 | 0.90 |
| 28 | 30 | 1.16 | 87.1 | 9.8 | 3.1 | | 6.78 | | 4.62 | 3800 | 4000 | 0.80 |
| 29 | 30 | 1.45 | 87.1 | 9.8 | 3.1 | | 6.78 | | 4.62 | 2500 | 2500 | 0.73 |
| 30 | 30 | 0.73 | 87.1 | 9.8 | 3.1 | | 6.83 | | 4.33 | 5600 | 5800 | 0.89 |
| 31 | 30 | 0.87 | 87.1 | 9.8 | 3.1 | | 6.83 | | 4.36 | 4400 | 4500 | 0.86 |
| 32 | 30 | 0.73 | 87.1 | 9.8 | 3.1 | | 7.43 | | 4.55 | 4000 | 4200 | 0.80 |
| 33 | 30 | 0.73 | 85.4 | 9.8 | 4.8 | | 7.43 | | 4.54 | 2400 | 2500 | 0.70 |
| 34 | 30 | 0.73 | 87.1 | 9.8 | 3.1 | | 7.24 | | 4.55 | 5500 | 5700 | 0.90 |
| 35 | 30 | 0.73 | 87.1 | 9.8 | 3.1 | | 7.26 | | 4.54 | 5600 | 6000 | 0.89 |
| 36 | 30 | 0.73 | 87.1 | 9.8 | 3.1 | | 7.40 | | 4.51 | 8600 | 9000 | 1.01 |

Footnotes - Refer to Glossary

THE WATER-IN-OIL EMULSIONS OF THE DADMAC POLYMERS

The water-in-oil emulsions of the DADMAC polymers useful in this invention contain four basic components. These components and their weight percentages in the emulsions are listed below:

A. The DADMAC polymers:
   1. Generally from 5–80%
   2. Preferably from 40–70%; and
   3. Most preferably from 45–65%;
B. Water:
   1. Generally from 20–90%;
   2. Preferably from 20–70%; and
   3. Most preferably from 30–55%;
C. Hydrophobic liquid:
   1. Generally from 5–75%;
   2. Preferably from 5–40%; and
   3. Most preferably from 20–30%: and,
D. Water-in-oil emulsifying agent:
   1. Generally from 0.1–21%:

useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain iso-paraffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent". Typical specifications of this material are set forth below in Table II.

TABLE II

| | |
|---|---|
| Specific Gravity 60°/60° F. | 0.780–0.806 |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benzene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF THE DADMAC POLYMERS

The general method for the preparation of emulsions of the type described is contained in Vanderhoff, U.S. Pat. No. 3,284,393, which is hereinafter incorporated by reference. A typical procedure for preparing water-in-oil emulsions of this type includes preparing an aqueous solution of a water-soluble vinyl addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water-soluble vinyl addition polymer is obtained. It should be pointed out that the ingredients are chosen based upon the weight percentages given above and their compatibility with each other. As to choice of free radical catalyst, these materials may be either oil or water-soluble and may be from the group consisting of organic peroxides, Vazo[1] type materials, redox type initiator systems, etc. Additionally, ultraviolet light, microwaves, etc. will also cause the polymerization of water-in-oil emulsions of this type.
[1]Reg. TM, E. I. duPont In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizng various oil-soluble polymers such as polyisobutylene. Employment of techniques of this type provides for superior stabilized emulsions.

Of still further interest is U.S. Pat. No. 3,997,492 which describes the formation of water-in-oil emulsions of the type above described utilizng emulsifiers having HLB values of between 4–9.

Of pertinence is U.S. Pat. No. 4,077,930 and U.S. Pat. No. 3,920,599 which specifically deal with water-in-oil polymerization methods for DADMAC polymers.

PHYSICAL PROPERTIES OF THE WATER-IN-OIL EMULSIONS

The water-in-oil emulsions of the DADMAC polymers useful in this invention contain relatively large amounts of polymer. The polymers dispersed in the emulsion are quite stable when the particle size of the polymer is from the range of 0.1 microns up to abouat 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 1,000 cps. It will be seen, however, that the viscosity of these emulsions can be affected greatly by increasing or decreasing the polymer content, oil content, or water content as well as the choice of a suitable water-in-oil emulsifier.

Another factor attributing to the vicosity of these types of emulsions in the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e. pumpable.

THE INVERSION OF THE WATER-IN-OIL EMULSIONS OF THE WATER-SOLUBLE VINYL ADDITION POLYMERS

The water-in-oil emulsions of the DADMAC polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019 and U.S. Pat. No. 4,077,930, hereinafter incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophillic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5.

Using the above procedure, a variety of emulsion polymers of DADMAC containing 10 mol percent of acrylic acid are set forth below in Table III.

TABLE III

Polymerization in Emulsion Form
10 Mole % Acrylic Acid/DADMAC Copolymer

| Polymer No. | Solid % | Init. #1 | Conc. % Init. #1 | Init. #2 % Conc. | Pump C/Time | Post Heat | IV |
|---|---|---|---|---|---|---|---|
| 1 | 45 | APS | 25.00 | | 55/4.5 | 75/1.5 | |
| 2 | 45 | APS | 25.00 | | 65/4.5 | 75/1.5 | |
| 3 | 45 | APS | 25.00 | | 75/4.5 | 80/1.5 | |
| 4 | 45 | APS | 25.00 | | 55/4.5 | 75/1.5 | 1.81 |
| 5 | 45 | APS | 25.00 | | 65/4.5 | 75/1.5 | 1.75 |
| 6 | 45 | APS | 25.00 | | 75/4.5 | 80/1.5 | 1.41 |
| 7 | 45 | APS | 12.50 | | 64/4.5 | 75/1.5 | 1.91 |
| 8 | 45 | APS | 12.50 | | 70/4.5 | 75/1.5 | 1.77 |
| 9 | 45 | APS | 12.50 | | 75/4.5 | 80/1.5 | 1.72 |

TABLE III-continued

Polymerization in Emulsion Form
10 Mole % Acrylic Acid/DADMAC Copolymer

| Polymer No. | Solid % | Init. #1 | Conc. % Init. #1 | Init. #2 % Conc. | Pump C/Time | Post Heat | IV |
|---|---|---|---|---|---|---|---|
| 10 | 45 | APS | 6.25 | | 70/4.5 | 75/1.5 | 1.93 |
| 11 | 45 | APS | 6.25 | | 75/4.5 | 80/1.5 | 1.81 |
| 12 | 45 | V50 | 5.00 | | 65/4.5 | 75/1.5 | 1.53 |
| 13 | 45 | V50 | 10.00 | | 65/4.5 | 75/1.5 | 1.77 |
| 14 | 45 | APS | 6.25 | | 65/4.5 | 75/1.5 | 1.82 |
| 15 | 45 | V50 | 5.00 | 10% APS | 65/3.5 | 75/1.5 | 1.64 |
| 16 | 45 | APS | 10.00 | | 65/3.5 | 75/1.5 | 1.72 |
| 17 | 45 | APS | 12.50 | | 65/3.5 | 75/1.5 | 1.92 |
| 18 | 45 | APS | 6.25 | | 70/4.5 | 75/2.5 | 2.00 |
| 19 | 45 | APS | 6.25 | | 70/4.5 | 75/1.5 | 1.75 |
| 20 | 45 | APS | 12.50 | | 70/4.5 | 75/2.5 | 1.70 |
| 21 | 45 | APS | 12.50 | | 70/4.5 | 75/1.5 | 1.74 |
| 22 | 45 | APS | 12.50 | | 65/4.5 | 75/2.5 | GEL |
| 23 | 45 | APS | 12.50 | | 65/4.5 | 75/1.5 | 2.30 |

USE OF THE DADMAC POLYMERS TO REMOVE IMPURITIES FROM WATER

The polymers of the invention are particularly useful in removing suspended solids from water or removing liquid impurities which are emulsified in water by the expediency of breaking these emulsions. As will be shown hereafter, these polymers are particularly effective in removing impurities from waters, which waters are exemplified by refinery waste waters; automotive oily effluent waters; raw waters such as those waters taken from rivers, ponds and streams; industrial process waters such as coal wash waters; sewage paper mill effluent waters; and the like.

It is important to note that the polymers of the invention are far superior to known DADMAC homo- and copolymers. For example, DADMADC polymers were initially described in U.S. Pat. No. 3,288,770. They are indicated as being useful for a variety of purposes such as textile treatment agents, rubber curring agents, and the like. Their preparation in the water-in-oil emulsion form is described in U.S. Pat. No. 3,920,599 and U.S. Pat. No. 4,077,930. The later patent describes many uses of DADMAC acrylamide copolymers and poly-DADMAC polymers for such purposes as drainage aids, retention aids, saveall flotation aids, and process water flocculants. Of interest is the fact that this patent does not specifically disclose in its working examples ampholytic polymers used in the practice of this invention.

To illustrate the ability of the DADMAC polymers of this invention to remove impurities from water, they were tested on a variety of impure aqueous systems. These results are presented below in the Examples:

EXAMPLES

DADMAC/AA copolymers (I.V. 0.57) (AA=acrylic acid, MAA=methacrylic acid, HPA=hydroxypropylacrylate), showed superior performance in comparison with DADMAC homopolymer (I.V. 0.8–1.0), EDC/NH3, Epi/DMA and other conventional polyelectrolytes in the separation of oil from automotive and refinery oily wastes (Table V, VI, and VIII). The runnability (dosage range) was also enhanced by 100%.

It has been observed that high I.V. DADMAC/AA, MAA (0.6–0.8) performs superior to conventional chemistries in wastewater color removal and raw and paper mill effluent application (Table IV and VII).

TABLE IV

| | Raw water | |
|---|---|---|
| Product | Intrinsic Viscosity | Optimum Dose at Eq. Actives, ppm |
| p-DADMAC | 1.00 | 50.0 |
| p-DADMAC | 0.30 | NA |
| Epi/DMA | 0.30 | NA |
| EDC/NH$_3$ | 0.30 | NA |
| DADMAC/AA (90/10) | 0.71 | 40.0 |
| DADMAC/AA (90/10) | 0.96 | 38.0 |
| DADMAC/MAA (95/5) | 0.65 | 31.2 |
| DADMAC/AA (90/10) | 0.65 | 40.0 |
| DADMAC/AA/HPA (90/10/10) | 0.60 | 50.0 |

TABLE V

| | Typical Refinery Wastewater | |
|---|---|---|
| Product | Intrinsic Viscosity | Optimum Dose at Eq. Actives, ppm | Dosage Range at Eq. Actives, ppm |
| p-DADMAC | 1.00 | 20.00 | 6.0 |
| p-DADMAC | 0.30 | NA | |
| Epi/DMA | 0.30 | NA | |
| EDC/NH$_3$ | 0.30 | NA | |
| DADMAC/AA (90/10) | 0.71 | 10.0 | 16.0 |
| DADMAC/AA (90/10) | 0.96 | 15.0 | 20.0 |
| DADMAC/MAA (95/5) | 0.65 | 16.0 | 16.7 |
| DADMAC/AA (90/10) | 0.65 | 5.7 | 33.3 |
| DADMAC/AA/HPA (90/10/10) | 0.60 | 7.2 | 14.4 |

TABLE VI

| | Typical Refinery Wastewater | |
|---|---|---|
| Product | Intrinsic Viscosity | Optimum Dose at Eq. Actives, ppm | Dosage Range at Eq. Actives, ppm |
| p-DADMAC | 0.50 | NA | |
| Epi/DMA | 0.30 | 11.7 | 11.0 |
| EDC/NH$_3$ | 0.30 | 17.7 | 38.3 |
| DADMAC/AA (90/10) | 0.71 | 6.0 | 36.0 |
| DADMAC/AA (90/10) | 0.84 | 3.0 | 39.0 |

TABLE VII

| | Typical Paper Mill Colored Effluent | |
|---|---|---|
| Product | Intrinsic Viscosity | Optimum Dose at Eq. Actives, ppm | Dosage Range at Eq. Actives, ppm |
| p-DADMAC | 0.50 | 200 | |
| p-DADMAC | 1.00 | 160 | |
| Epi/DMA | 0.30 | 250 | 11.0 |
| EDC/NH$_3$ | 0.30 | NA | 38.3 |
| DADMAC/AA (90/10) | 0.71 | 196 | 36.0 |

TABLE VIII

| | Typical Automotive Oily Effluent | |
|---|---|---|
| Product | Intrinsic Viscosity | Optimum Dose at Eq. Actives, ppm | Dosage Range at Eq. Actives, ppm |
| p-DADMAC | 0.30 | 250 | 25.0 |
| p-DADMAC | 1.00 | 200 | 33.3 |
| Epi/DMA | 0.30 | 250 | 35.0 |
| EDC/NH$_3$ | 0.30 | 295 | 50.0 |
| DADMAC/AA (90/10) | 0.71 | 150 | 113.3 |
| DADMAC/AA (90/10) | 0.65 | 160 | 80.0 |
| DADMAC/MAA (95/5) | 0.55 | 183 | 40.0 |

Having thus described my invention it is claimed:

1. A method of removing emulsified impurities from a waste oil emulsion selected from the group consisting of a petroleum refinery waste water and an automotive oily effluent water which comprises treating these impurity-containing waters with an effective amount of a water-soluble polymer consisting essentially of Diallyldimethyl Ammonium Chloride and either,
    A. from 5 to 25 mole percent of either acrylic acid or methacrylic acid, or,
    B. from 5 to 25 mole percent of either acrylic acid or methacrylic acid and from 1–10 percent of a hydroxy $C_2$–$C_6$ alkyl acrylate or methacrylate:
    which polymer has an intrinsic viscosity of at least 0.5, and then separating the polymer and emulsified impurities from the impurity-containing waters.

2. The method of claim 1 where the hydroxy $C_2$–$C_6$ alkyl acrylate is hydroxy propyl acrylate.

3. The method of claim 2 where the water-soluble polymer is an acrylic acid containing polymer.

4. The method of claim 1 where the water-soluble polymer is an acrylic acid containing polymer.

5. The method of claim 1 where the waste oil emulsion is a petroleum refinery waste water.

6. The method of claim 1 where the waste oil emulsion is a automotive oily effluent water.

* * * * *